(12) United States Patent
Howe

(10) Patent No.: US 7,701,956 B2
(45) Date of Patent: Apr. 20, 2010

(54) METHOD AND SYSTEM FOR USING A TRANSFER AGENT FOR TRANSLATING A CONFIGURATION FILE

(75) Inventor: Jeffrey J. Howe, West Chicago, IL (US)

(73) Assignee: ARRIS Group, Inc., Suwanee, GA (US)

( * ) Notice: Subject to any disclaimer, the term of this patent is extended or adjusted under 35 U.S.C. 154(b) by 1014 days.

(21) Appl. No.: 11/363,978

(22) Filed: Feb. 28, 2006

(65) Prior Publication Data
US 2006/0195611 A1    Aug. 31, 2006

Related U.S. Application Data

(60) Provisional application No. 60/657,156, filed on Feb. 28, 2005.

(51) Int. Cl.
| H04L 12/28 | (2006.01) |
| H04L 9/32 | (2006.01) |
| G06F 15/16 | (2006.01) |
| H04N 7/173 | (2006.01) |

(52) U.S. Cl. .................. 370/401; 709/203; 709/217; 709/245; 726/2; 725/111; 725/114

(58) Field of Classification Search ................ 709/203, 709/217–226, 245; 370/401
See application file for complete search history.

(56) References Cited

U.S. PATENT DOCUMENTS

| 6,049,826 | A | * | 4/2000 | Beser | 709/222 |
| 6,070,187 | A | * | 5/2000 | Subramaniam et al. | 709/220 |
| 6,070,246 | A | * | 5/2000 | Beser | 726/2 |
| 6,185,623 | B1 | * | 2/2001 | Bailey et al. | 709/238 |
| 6,691,227 | B1 | * | 2/2004 | Neves et al. | 713/162 |
| 6,717,949 | B1 | * | 4/2004 | Boden et al. | 370/401 |
| 7,293,282 | B2 | * | 11/2007 | Danforth et al. | 726/4 |
| 2003/0187997 | A1 | * | 10/2003 | Alexis | 709/229 |

OTHER PUBLICATIONS

Fry et al. A Caching DHCP Relay Agent, Rennsselaer Polytechnic Institute, Oct. 1997, pp. 1-13 <http://www.cs.rpi.edu/research/tr/97-10.pdf>.*

* cited by examiner

*Primary Examiner*—Chirag G Shah
*Assistant Examiner*—Jenkey Van
(74) *Attorney, Agent, or Firm*—Troy A. Van Aacken; Robert J. Starr

(57) ABSTRACT

TFTP server address, configuration file name and relay agent address contained in a DHCPACK are recorded; the TFTP server address is overwritten with the relay agent address before forwarding.

Upon receipt of a TFTP request, a transfer identifier is selected from a pool of available port values, and the source address/port pair and relay agent's address are associated therewith. The relay agent's address and the transfer identifier replace the source address/port pair, and a check is made to determine whether the cable modem is requesting the correct configuration file. Action may be taken if the CM requests an incorrect filename, or if configuration TLVs are incorrect.

The relay agent retrieves the TFTP server's address/port pair from the first TFTP data packet received, and associates these with the transfer identifier before returning it to the available pool. The transfer identifier is used to lookup the CM address/port pair.

16 Claims, 1 Drawing Sheet

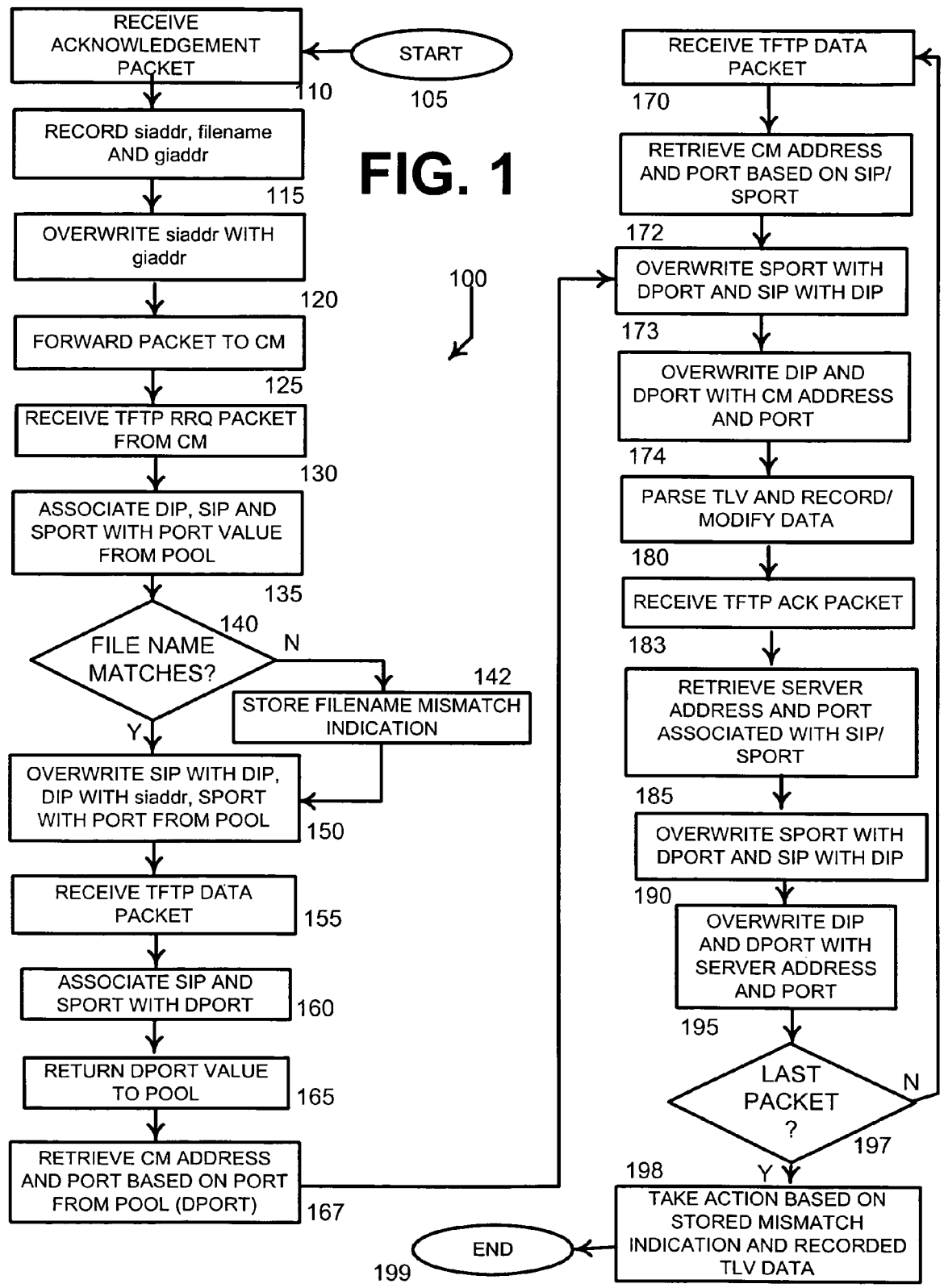

METHOD AND SYSTEM FOR USING A TRANSFER AGENT FOR TRANSLATING A CONFIGURATION FILE

CROSS REFERENCE TO RELATED APPLICATION

This application claims priority under 35 U.S.C. 119(e) to U.S. provisional patent application No. 60/657,156 entitled "Secure cable modem configuration file verification via a TFTP relay agent," which was filed Feb. 28, 2005, and is incorporated herein by reference in its entirety.

FIELD OF THE INVENTION

This invention relates, generally, to communication networks and devices and, more particularly, to preventing unauthorized use of configuration file information.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

As with any providing of goods and/or services, the service of providing information over a broadband connection is unfortunately the target of fraud and theft. Since the providing of broadband services costs a certain amount, and the more bandwidth resources provided incurs an increasingly proportional amount of cost, unscrupulous users who subscribe to a certain amount of bandwidth resources often attempt to obtain a higher level of service without paying for it.

There are a number of methods by which theft of service occurs, including replaying a different, but valid, cable modem configuration file corresponding to higher service than the legitimate one associated with the subscriber's lower subscribed-to service level. Another method is for a hacker to generate a configuration file and use it to register the cable modem ("CM"). The hacker can generate a file if they discover the shared secret key that an MSO uses to generate a configuration file.

Thus, there is a need for a method and system for assuring that a cable modem downloads configuration information from the correct file on the correct server, and that the configuration information is not altered before a registration request is generated.

SUMMARY

This is accomplished by relaying TFTP requests and responses between a cable modem and a TFTP server, while monitoring the contents of the configuration information. A relay agent at a relaying agent, typically a cable modem termination system ("CMTS"), appears to the cable modem as the TFTP server, and appears to the TFTP server as the cable modem. When a TFTP read request is received at the CMTS from the CM, a port number retrieved from a predetermined number of available ports is substituted for the port number of the CM. A check is performed at the CMTS to ensure that the requested configuration file name matches the file name in the DHCP packet, typically the DHCP ACK packet as known in the art, which has already been sent to the CM. If the file name matches, the relay agent forwards the TFTP read request packet from the CM to the TFTP server using the relay agent's address as the source address, the TFTP server's address as the destination address and the port number retrieved from the pool as the port number.

When data from the TFTP server destined for the CM is received at the relay agent, a determination is made whether a packet is the first packet of the TFTP data. If so, the source address/port pair are associated with the port number and the CM IP address/port pair that was previously associated with the port number retrieved from the pool. Then, this port number is returned to the pool for use by requests from other devices.

If the TFTP data packet is not the first packet of TFTP data, the source address and port are used to determine the address of the CM and the port number used by the CM. The TFTP source address and port numbers are replaced with the address of the relay agent/CMTS and the previously retrieved port number from the pool, respectively, and the destination address and port numbers are replaced with the address of the CM and the port number used by the CM determined from the source address/port pair originally in the packet.

Although the port number has been returned to the pool, the TFTP (source) address and port numbers are replaced with the address of the relay agent and the previously retrieved port number from the pool, respectively. This address/port number pair may be used to determine the address of the CM and the port number used by the CM when it sent the TFTP read request packet(s). These values corresponding to the source address and port numbers used in the TFTP read request are used by the relay agent as the destination address/port number for forwarding the TFTP data packets to the CM.

A TFTP acknowledgement packet received at the relay agent from the CM is modified at the relay agent by replacing the source address and port number with the destination address and port number, and by replacing the destination address and port number with the address of the server and the port number used by the server determined by looking up the server information associated with the source address/port pair originally in the packet. The modified TFTP acknowledgement packet is then forwarded to the TFTP server.

BRIEF DESCRIPTION OF DRAWINGS

FIG. 1 illustrates a flow diagram of a method for providing configuration information to a CM using a relay agent.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning to FIG. 1, a flow diagram of a method 100 for providing configuration information to a cable modem using a relay agent is illustrated. It will be appreciated that the relay agent is typically software running on the CMTS, and operates on packets sent to and from the cable modem, but may be referred to as a relaying agent gateway.

Method 100 starts at step 105 when a DHCP acknowledgement ("DHCP ACK") packet is received at step 110 at the relay agent running on a CMTS. Instead of just forwarding the packet on to the cable, the relay agent at the CMTS intercepts the DHCP ACK and records at step 115 the address of the TFTP server (siaddr) from which the cable modem should request configuration information, the configuration file name contained in the packet and the address of the relaying agent gateway (giaddr). It will be appreciated that the address, giaddr, of the relay agent gateway is the address of the CMTS because the relay agent is running on the CMTS. After step 115, the relay agent overwrites the address of the TFTP server, siaddr, with giaddr at step 120. The packet is then forwarded to the cable modem at step 125 from the relay agent.

After receiving the DHCP ACK, the cable modem sends a TFTP read request packet toward the TFTP server. However, since the DHCP ACK was forwarded by the relay agent and the relay agent/CMTS address was substituted for the address of the TFTP server, the cable modem sends the TFTP request to the relay agent instead of directly to the TFTP server. The relay agent receives the TFTP read request packet from the cable modem at step 130.

At step 135, the relay agent associates the destination address ("DIP"), which is the address of the relay agent/CMTS, the source address ("SIP") of the cable modem and the source port ("SPORT") used by the cable modem with a transfer identifier. The transfer identifier is a port number retrieved from an available pool of port numbers. In the preferred embodiment, the pool comprises port numbers 6912 through 6943, which are registered ports that are currently unassigned by IANA, as known in the art.

At step 140, the relay agent determines whether the configuration file requested in the TFTP read request packet matches the file name recorded at step 115. If not, a filename mismatch message is stored at step 142 and the method advances to step 150.

If at step 140 a determination is made that the configuration file name in the TFTP request matches the name recorded at step 115, the process continues to step 150. At step 150, the relay agent overwrites the source address in the TFTP read request packet with the destination address contained therein, the destination address with siaddr (address of TFTP server) and the source port with the transfer identifier retrieved from the pool at step 135. The relay agent then forwards the TFTP read request packet according to the new destination address contained in the packet received at step 130, this new destination address being the stored siaddr.

Upon receiving the TFTP request packet from the relay agent, the TFTP server sends in reply TFTP data that may comprise more than one packet. The TFTP data packet(s) are sent to the relay agent because the source address of the packet modified at step 150 is the address of the relay agent rather than the cable modem. It will be appreciated that the data packets are sent one-at-a-time, waiting for an acknowledgement after each one.

The relay agent receives a TFTP data packet from the TFTP server at step 155. At step 160, the source address and port contained in the packet are associated with the transfer identifier, which is the destination port value in the TFTP data packet. Then, the transfer identifier is returned to the pool of available identifiers at step 165, so it may be used for other requests.

Because of the associations made at steps 135 and 160, the transfer identifier now may be used as a link between the CM address/port pair and the TFTP address/port pair. It will be appreciated that although the transfer identifier is returned to the pool, it may still be used for the current TFTP transaction and will not cause a conflict with other transactions because packets in each of those transactions is unique as defined by their respective CM and/or TFTP server address/port pair(s).

At step 167, the CM address and port are retrieved based on the transfer identifier. At step 173, the SIP and SPORT are replaced with the DIP and DPORT, respectively. Then, the DIP and DPORT are overwritten with the address and port of the CM at step 174. Type-length values are evaluated and recorded and possibly modified at step 180 before the packet is forwarded to the CM.

After receiving a TFTP data packet, a cable modem sends a packet back to the TFTP server acknowledging that it received same. After a TFTP acknowledgement packet is received from the cable modem at step 183, the TFTP server address and port are retrieved at step 185 based on the source address/port pair, which is the CM address/port pair. At step 190, the source port and address values are replaced with the destination port and address values, respectively. At step 195, the destination address and port values are overwritten with the TFTP server address and port values, respectively, and the acknowledgment packet is forwarded to the TFTP server.

A determination is made at step 197 whether a received data packet is the last TFTP data packet. If not, the process returns to step 170 and another TFTP data packet is received. The CM address and port values are retrieved at step 172 based on the SIP/SPORT pair, which is the TFTP server address/port pair, the CM address/port values being linked with the TFTP server address/port values by the transfer identifier as discussed above. The process continues to step 173 as discussed above.

If the determination at step 197 is yes, action is taken at step 198, when the CM sends a registration request. The action taken may be based on whether a filename mismatch message was recorded at step 142 and/or be based on the TLV data recorded at step 180. It will be appreciated that the MSO may decide to deny registration of the requesting cable modem at step 198. Alternatively, the MSO may decide to grant the registration request, but at a lower bandwidth, or quality of service ("QoS"). In addition, the MSO may decide to allow the requested registration at the requested QoS, but initiate a warning or message display that the cable modem has been granted an unauthorized level of QoS. The process ends at step 199.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for transferring a configuration file to a cable modem, comprising:
   intercepting by a relay agent within a cable modem termination system (CMTS) a DHCP packet destined for the cable modem,
   recording information contained in the DHCP packet, including the address of a TFTP server and the file name of a configuration file;
   forwarding the DHCP packet to the cable modem with the address of the relay agent in place of the address of the TFTP server;
   associating the destination address, the source address and the source port number value of a TFTP read request packet with a transfer identifier selected from a pool of predetermined port number values;
   verifying that the configuration file name contained in the TFTP request packet matches the file name contained in the DHCP packet;
   if the configuration file name contained in the TFTP request packet does not match the file name contained in the DHCP packet, signaling a file name mismatch error; and
   forwarding the TFTP read request packet with the address of the relay agent as the source address, the transfer identifier as the source port and the recorded address of the TFTP server as the destination address;
   determining whether one or more configuration settings identified within one or more configuration packets are anomalous; and
   if the configuration settings are anomalous, taking a predetermined action comprising one or more of:
   denying registration of the requesting cable modem;
   granting the registration request, but at a lower bandwidth; or
   allowing the requested registration at the requested bandwidth and initiating a warning or message display that the cable modem has been granted an unauthorized bandwidth level.

2. The method of claim 1 further comprising:
   receiving a TFTP data packet at the relay agent as part of a TFTP transfer;
   associating the source address and source port number contained in the TFTP data packet with the transfer identifier;
   returning the transfer identifier to the pool of available transfer identifiers when the TFTP data packet is received, while the TFTP transfer is still in progress;
   replacing the source address with the relay agent's address and the source port with the transfer identifier;
   determining the address and port number associated with the cable modem based on the transfer identifier;
   replacing the destination address and destination port number value with the address and port number value determined to be associated with the cable modem; and
   forwarding the TFTP data packet to the cable modem.

3. The method of claim 2 further comprising:
   receiving a TFTP acknowledgement packet from a cable modem;
   replacing source address and port with the relay agent address and transfer identifier, respectively;
   retrieving TFTP server address and port number based on the source address and port corresponding to the cable modem;
   replacing destination address and port number with the TFTP server address and port number, respectively; and
   forwarding the TFTP acknowledgement packet to the TFTP server.

4. The method of claim 2 further comprising:
   parsing configuration settings identified by type, length and value, the configuration settings being included in TFTP data packets.

5. The method of claim 1 wherein the DHCP packet is a DHCP ACK packet.

6. The method of claim 1 wherein the pool of predetermined port number values includes port numbers 6912 through 6943.

7. The method of claim 1 further comprising taking a predetermined action if the configuration file name contained in the TFTP request packet does not match the file name contained in the DHCP packet.

8. The method of claim 7 wherein the predetermined action taken includes denying registration of the requesting cable modem; granting the registration request, but at a lower bandwidth; or allowing the requested registration at the requested bandwidth and initiating a warning or message display that the cable modem has been granted an unauthorized bandwidth level.

9. A system for transferring a configuration file to a cable modem, comprising:
   means for intercepting by a relay agent within a cable modem termination system (CMTS) a DHCP packet destined for the cable modem,
   means for recording information contained in the DHCP packet, including the source address of a TFTP server and the file name of a configuration file;
   means for forwarding the DHCP packet to the cable modem with the address of the relay agent in place of the address of the TFTP server;
   means for associating the destination address, the source address and the source port number value of a TFTP read request packet with a transfer identifier selected from a pool of predetermined port number values;
   means for forwarding the TFTP read request packet with the address of the relay agent as the source address, the transfer identifier as the source port and the recorded address of the TFTP server as the destination address;
   means for receiving a TFTP data packet at the relay agent;
   means for parsing configuration settings identified by type, length and value, the configuration settings being included in TFTP data packet;
   means for identifying an anomaly in the configuration settings included in the TFTP data packet at the relay agent; and
   means for taking a predetermined action if the configuration settings included in the TFTP data packets is anomalous, wherein the predetermined action comprising one or more of:
   denying registration of the requesting cable modem;
   granting the registration request, but at a lower bandwidth; or
   allowing the requested registration at the requested bandwidth and initiating a warning or message display that the cable modem has been granted an unauthorized bandwidth level.

10. The system of claim 9 further comprising:
    means for associating the source address and source port number contained in the TFTP data packet with the transfer identifier;
    means for returning the transfer identifier to the pool of available transfer identifiers when the TFTP data packet is received, while the TFTP transfer is still in progress;

means for replacing the source address with the relay agent's address and the source port with the transfer identifier;

means for determining the address and port number associated with the cable modem based on the transfer identifier;

means for replacing the destination address and destination port number value with the address and port number value determined to be associated with the cable modem; and means for forwarding the TFTP data packet to the cable modem.

11. The system of claim 10 further comprising:

means for receiving a TFTP acknowledgement packet from a cable modem;

means for replacing source address and port with the relay agent address and transfer identifier, respectively;

means for retrieving TFTP server address and port number based on the source address and port corresponding to the cable modem;

means for replacing destination address and port number with the TFTP server address and port number, respectively; and means for forwarding the TFTP acknowledgement packet to the TFTP server.

12. The system of claim 9 further comprising verifying that the configuration file name contained in the TFTP request packet matches the file name contained in the DHCP packet.

13. The system of claim 9 wherein the DHCP packet is a DHCP ACK packet.

14. The system of claim 9 wherein the pool of predetermined port number values includes port numbers 6912 through 6943.

15. A computer-implemented method of identifying unauthorized network registration, comprising:

intercepting by a relay agent within a cable modem termination system (CMTS) a DHCP packet destined for a cable modem;

storing the information included in the DHCP packet in a data store, the information including an authorized configuration filename;

modifying the DHCP packet to include the address of the relay agent as the TFTP address;

forwarding the modified DHCP packet to the cable modem;

receiving a configuration file request associated with the modified DHCP packet at the relay agent;

determining whether a requested configuration filename included in the configuration file request matches the authorized configuration filename;

if the requested configuration filename does not match the authorized configuration filename, signaling a filename mismatch error identifying an unauthorized network registration;

forwarding the modified configuration file request including the requested configuration filename to a TFTP server;

receiving one or more configuration packets associated with the modified configuration file request at the relay agent;

determining whether one or more configuration settings identified within the one or more configuration file packets are anomalous;

receiving at the relay agent a registration request from the cable modem, the registration request including the configuration file;

if the configuration settings are anomalous or a file mismatch error is signaled:

denying the registration request from the cable modem;

reducing a quality of service associated with the cable modem in response to the registration request; or signaling an administrator or user of the cable modem that an unauthorized quality of service level has been requested within the registration request.

16. The computer-implemented method of claim 15, wherein the step of forwarding the modified configuration file request to the TFTP server comprises:

modifying the configuration file request to include the address of the relay agent as the source address, and forwarding the modified configuration file request to the TFTP server.

* * * * *